(12) United States Patent
Dailey

(10) Patent No.: US 9,257,214 B1
(45) Date of Patent: Feb. 9, 2016

(54) BUS BAR EXTENDER

(71) Applicant: Google Inc., Mountain View, CA (US)

(72) Inventor: William Leslie Dailey, Redwood City, CA (US)

(73) Assignee: Google Inc., Mountain View, CA (US)

( * ) Notice: Subject to any disclaimer, the term of this patent is extended or adjusted under 35 U.S.C. 154(b) by 173 days.

(21) Appl. No.: 13/798,937

(22) Filed: Mar. 13, 2013

(51) Int. Cl.
*H02G 5/00* (2006.01)
*H01B 5/02* (2006.01)
*H01R 43/26* (2006.01)
*H02G 5/06* (2006.01)
*H01R 4/00* (2006.01)
*H02G 3/06* (2006.01)
*H02G 15/08* (2006.01)

(52) U.S. Cl.
CPC .................. *H01B 5/02* (2013.01); *H01R 43/26* (2013.01); *H02G 5/00* (2013.01); *H02G 5/005* (2013.01)

(58) Field of Classification Search
CPC ................................. H02G 5/00; H02G 5/005
USPC ........ 174/16.2, 68.2, 70 B, 71 B, 72 B, 88 B, 174/99 B, 129 B, 133 B, 149 B
See application file for complete search history.

(56) References Cited

U.S. PATENT DOCUMENTS

2004/0087221 A1* 5/2004 Meiners et al. ............... 439/798

OTHER PUBLICATIONS

Bus Bar Interconnects, http://www.te.com/catalog/connector/bus-bar/menu/en/17694, downloaded from the Internet Mar. 13, 2012, 2 pages.
Quick Reference Guide, 2-Piece Power Connectors brochure, te.com/powerconnectors, 6 pages.
Rapid Lock Bus Bar Connectors/TE Connectivity, http://www.ttiinc.com/object/tyco_electronics_rapid_lock.html, downloaded from the Internet Mar. 13, 2012, 1 page.
Bus Bar Connector meets high current telecom requirements, http://news.thomasnet.com/fullstory/Bus-Bar-Connector-meets-high-current . . . , downloaded from the Internet Mar. 13, 2012, 3 pgs.

* cited by examiner

*Primary Examiner* — Hoa C Nguyen
*Assistant Examiner* — Binh Tran
(74) *Attorney, Agent, or Firm* — Lerner, David, Littenberg, Krumholz & Mentlik, LLP

(57) ABSTRACT

An apparatus for extending a bus bar is disclosed. The apparatus may include a first extension piece and a second extension piece. The first extension piece may have multiple surfaces. A first surface may have a first group of receiving portions, a second may have a second group of receiving portions, and a third surface may have a curvature that offsets the third surface from the second surface. The second extension piece may also have multiple surfaces. The second extension piece may have a first surface that includes a first group of receiving portions, a second surface that includes a second group of receiving portions, and a third surface that is substantially parallel to the second surface and includes a third group of receiving portions. When connected to a bus bar, the first extension piece and the second extension piece may be substantially adjacent to one another.

21 Claims, 4 Drawing Sheets

BUS BAR EXTENDER

BACKGROUND

In electrical power distribution, a bus bar is an apparatus that distributes power to multiple connected devices, that conducts electricity within a switchboard, distribution board, substation or other electrical apparatus. The bus bar may be an aluminum or copper conductor supported by insulators that interconnects the loads and the sources of electric power in an electric power system. A typical application is the interconnection of the incoming and outgoing transmission lines and transformers at an electrical substation. Bus bars also interconnect the generator and the main transformers in a power plant. In an industrial plant such as an aluminum smelter, large bus bars supply several tens of thousands of amperes to the electrolytic process.

There are several different types of bus bars. For example, there are rigid bus bars, used at low, medium, and high voltage; strain bus bars, used mainly for high voltage; insulated-phase bus bars, used at medium voltage; and sulfur hexafluoride (SF6)-insulated bus bars, used in medium- and high-voltage systems. The rigid bus-bar is an aluminum or copper bar, which is supported by porcelain insulators. The strain bus-bar is a flexible, stranded conductor which is strung between substation metal structures and held by suspension-type insulators. The insulated-phase bus-bar is a rigid bar supported by insulators and covered by a grounded metal shield. The sulfur hexafluoride-insulated bus-bar is a rigid aluminum tube, supported by insulators and installed in a larger metal tube, which is filled with high-pressure sulfur hexafluoride gas.

One of the challenges in designing a bus bar is accurately estimating the number of connections that may be made with the bus bar. As system and power requirements change, the number of connections to the bus bar may increase.

SUMMARY

To address these and other problems, this disclosure provides for an apparatus for extending a bus bar, wherein the apparatus includes a first extension piece and a second extension piece. The first extension piece may include a first vertically-oriented main axis, a first surface offset and vertically parallel to the first vertically-oriented main axis, the first surface comprising a first plurality of receiving portions, a second surface, the second surface offset and vertically parallel to the first-vertically oriented main axis, the second surface comprising a second plurality of receiving portions, wherein the second plurality of receiving portions are configured to establish an electrical connection between the first extension piece and a bus bar, and a third surface offset and vertically parallel to the first-vertically oriented main axis, the third surface comprising a curved portion. The second extension piece may include a second vertically-oriented main axis, a fourth surface offset and vertically parallel to the second vertically-oriented main axis, the fourth surface comprising a third plurality of receiving portions, a fifth surface offset and vertically parallel to the second vertically-oriented main axis, the fifth surface comprising a fourth plurality of receiving portions, and a sixth surface offset and vertically parallel to the second vertically-oriented main axis, the sixth surface comprising a fifth plurality of receiving portions configured to establish an electrical connection between the second extension piece and the bus bar. The first extension piece is connectable to the bus bar via the second plurality of receiving portions and the second extension piece is connectable to the bus bar via the fifth plurality of receiving portions.

In another embodiment of the apparatus, a receiving portion of the first plurality of receiving portions is defined by an aperture disposed within the first surface.

In a further embodiment of the apparatus, a receiving portion of the first plurality of receiving portions receives a terminal for electrically connecting an electronic device to the bus bar.

In yet another embodiment of the apparatus, the first plurality of receiving portions are formed in a first plane, the second plurality of receiving portions are formed in a second plane, and the first plane is substantially perpendicular to the second plane.

In yet a further embodiment of the apparatus, the second plurality of receiving portions is defined by an aperture disposed within the second surface, and the first extension piece is connectable to the bus bar via a securing mechanism that enters into the aperture.

In another embodiment of the apparatus, a receiving portion of the third plurality of receiving portions is defined by an aperture disposed within the fourth surface.

In a further embodiment of the apparatus, a receiving portion of the third plurality of receiving portions receives a terminal for electrically connecting an electronic device to the bus bar.

In yet another embodiment of the apparatus, the third plurality of receiving portions are formed within a first plane, the fourth plurality of receiving portions are formed within a second plane, and the first plane is substantially perpendicular to the second plane.

In a yet a further embodiment of the apparatus, a receiving portion of the fifth plurality of receiving portions is defined by an aperture disposed within the sixth surface, and the second extension piece is connectable to the bus bar via a securing mechanism that enters into the aperture.

In another embodiment of the apparatus, the first surface defines a first plane, the second surface defines a second plane, the fourth surface defines a third plane, the fifth surface defines a fourth plane, the first plane is offset in a first direction substantially perpendicular to the second plane, and the third plane is offset in a second direction substantially perpendicular to the fourth plane.

In a further embodiment of the apparatus, the first extension piece comprises a first unitary structure, the second extension piece comprises a second unitary structure, and the first unitary structure is physically separate from the second unitary structure.

Another apparatus for extending a bus bar is also disclosed. In one embodiment, this apparatus includes a vertically-oriented main axis, a first surface offset and vertically parallel to the vertically-oriented main axis, the first surface having a first plurality of receiving portions, and each receiving portion is spaced apart along the first surface, a second surface offset and vertically parallel to the vertically-oriented main axis, the second surface being substantially perpendicular to the first surface and comprising a second plurality of receiving portions, wherein each receiving portion is spaced apart along the second surface and configured to establish an electrical connection between a bus bar and a corresponding receiving portion of the first plurality of receiving portions, and a third surface offset and vertically parallel to the vertically oriented main axis, substantially parallel to the second surface and substantially perpendicular to the first surface, and wherein the third surface is disposed between the first surface and the second surface.

In another embodiment of the apparatus, a receiving portion of the first plurality of receiving portions is defined by an aperture disposed within the first surface.

In a further embodiment of the apparatus, a receiving portion of the first plurality of receiving portions receives a terminal for electrically coupling an electronic device to a bus bar.

In yet another embodiment of the apparatus, a receiving portion of the second plurality of receiving portions is defined by an aperture disposed within the second surface, and the second surface is connectable to a bus bar via a securing mechanism that enters into the aperture.

In yet a further embodiment of the apparatus, the third surface comprises a curvature that laterally offsets the third surface from the second surface.

Yet another apparatus for extending a bus bar is disclosed. In one embodiment, this apparatus includes a vertically-oriented main axis, a first surface offset and vertically parallel to the vertically-oriented main axis, the first surface having a first plurality of receiving portions, wherein each receiving portion is spaced apart along the first surface, a second surface offset and vertically parallel to the vertically-oriented main axis, the second surface being substantially perpendicular to the first surface and comprising a second plurality of receiving portions, wherein each receiving portion is spaced apart along the second surface, and a third surface offset and vertically parallel to the vertically-oriented main axis, the third surface being substantially parallel to the second surface and substantially perpendicular to the first surface, wherein the third surface comprises a third plurality of receiving portions, each receiving portion being spaced apart along the third surface and configured to establish an electrical connection between a bus bar and a corresponding receiving portion of the first plurality of receiving portions.

In another embodiment of the apparatus, a receiving portion of the first plurality of receiving portions is defined by an aperture disposed within the first surface.

In a further embodiment of the apparatus, a receiving portion of the first plurality of receiving portions receives a terminal for electrically coupling an electronic device to a bus bar.

In yet another embodiment of the apparatus, a receiving portion of the third plurality of receiving portions is defined by an aperture disposed within the second surface, and the third surface is connectable to a bus bar via a securing mechanism that enters into the aperture.

In yet a further embodiment of the apparatus, a receiving portion of the second plurality of receiving portions is defined by an aperture disposed within the second surface, and the second surface is connectable to a support structure that supports a bus bar via a securing mechanism that enters into the aperture.

A method for securing a bus bar extender to a bus bar is also disclosed. In one embodiment, the method includes coupling a first bus bar extension piece of a bus bar extender to a bus bar, wherein the first bus bar extension piece includes a first receiving portion disposed within a first surface, a second receiving portion disposed within a second surface, the second surface being substantially perpendicular to the first surface, wherein the second receiving portion is configured to establish an electrical connection between the bus bar and the first receiving portion, a third receiving portion disposed within a third surface, the third surface being substantially perpendicular to the first surface and substantially parallel to the second surface, and a first electrical terminal extending from the first surface that is connectable with an electronic device to supply electricity to the electronic device from the bus bar. The method may also include coupling a second bus bar extension piece of the bus bar extender to the bus bar, wherein the second bus bar extension piece includes a fourth receiving portion disposed within a fourth surface, a fifth receiving portion disposed within a fifth surface, the fifth surface being substantially perpendicular to the fourth surface, a sixth receiving portion disposed within a sixth surface, the sixth surface being substantially perpendicular to the fourth surface and substantially parallel to the fifth surface, wherein the sixth receiving portion is configured to establish an electrical connection between the bus bar and the fourth receiving portion, a second electrical terminal extending from the fourth surface that is connectable with the electronic device to supply electricity to the electronic device from the bus bar, a securing mechanism extending from the fifth surface.

In another embodiment of the method, coupling the first bus bar extension piece to the bus bar comprises inserting a first fastener through the bus bar and into the second receiving portion of the first bus bar extension piece, and inserting a second fastener through the bus bar and into the third receiving portion of the first bus bar extension piece.

In a further embodiment of the method, coupling the second bus bar extension piece to the bus bar comprises inserting the securing mechanism through a bus bar support, and securing the securing mechanism to the bus bar support.

In yet another embodiment of the method, the electrical terminal is substantially perpendicular to the first surface of the first bus bar extension piece.

In yet a further embodiment of the method, the securing mechanism is relatively perpendicular to the fifth surface.

In another embodiment of the method, the first bus bar extension piece comprises a first unitary structure, the second bus bar extension piece comprises a second unitary structure, and the first unitary structure and the second unitary structure are physically separate structures.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The present disclosure relates to a bus bar extender that extends a length of an established bus bar. The bus bar extender may include one or more bus bar extension pieces, and the bus bar extension pieces may be substantially lateral with respect to one another when connected to a bus bar. The disclosed bus bar extender may establish an electrical connection between the established bus bar and a device connected to the bus bar extender. Although the present disclosure describes and illustrates that the bus bar extender includes two bus bar extension pieces, it is contemplated that the bus bar extender may include fewer or more bus bar extension pieces.

Figure 1:
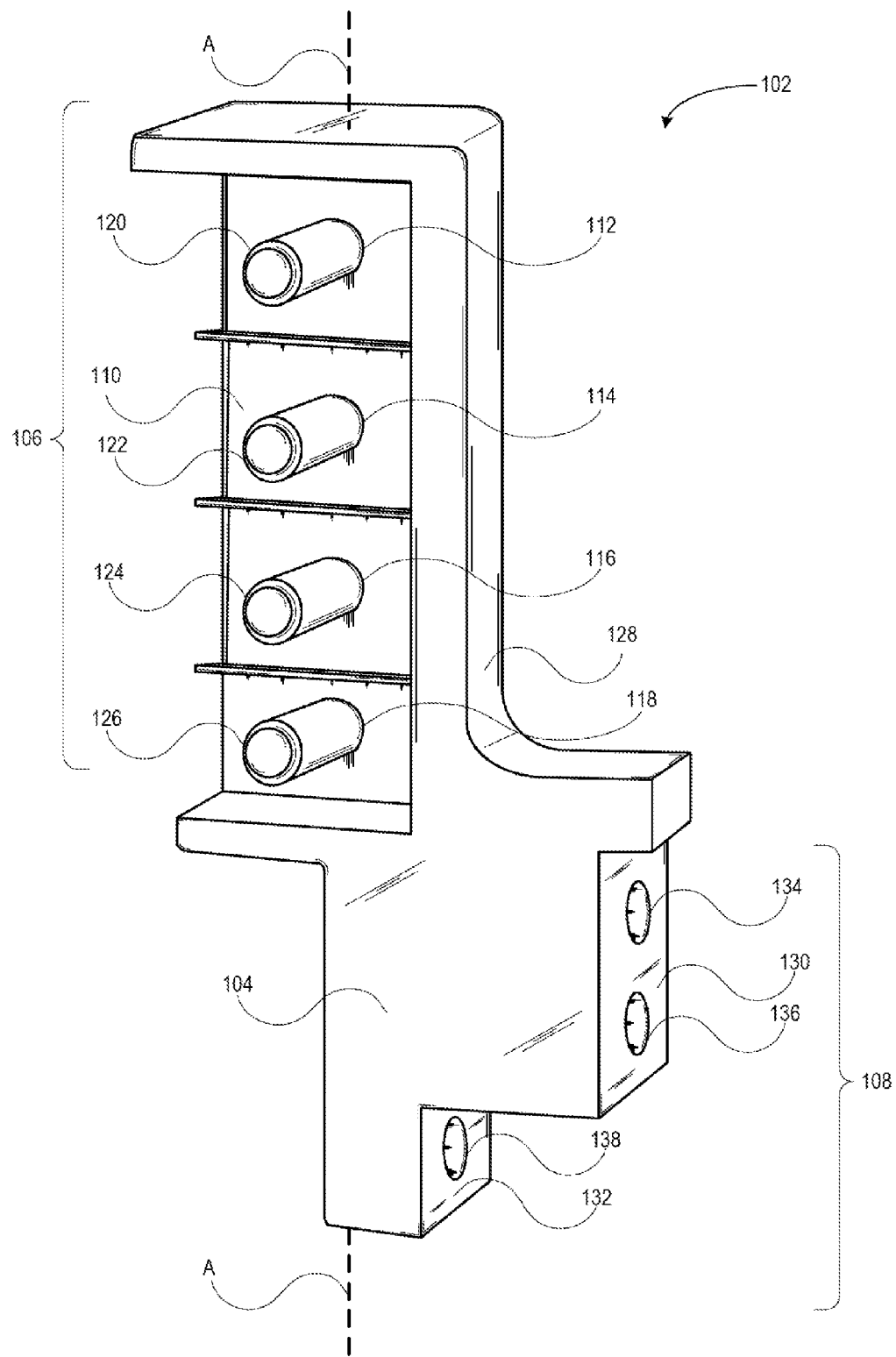
FIG. 1 illustrates an example of a first extension piece for a bus bar extender according to aspects of the disclosure.

FIG. 1 illustrates one example of a first bus bar extension piece 102. The first bus bar extension piece 102 may include primary block 104. The primary block 104 may be unitary in its construction, and formed from a conductive metal, such as copper or the like. The primary block 104 may be painted with a dielectric powder coat and color coded, using a red color, a black color, or the like, to assist in the assembly of the bus bar extender. It is also contemplated that one or more portions of the primary block 104 may not be painted, such as surface 130 and/or surface 132, which may function as electrical contact points. A vertically-oriented main axis A may extend lengthwise through the primary block 104.

The primary block 104 may include an upper portion 106 and a lower portion 108. The upper portion 106 may include a first surface 110 that extends substantially along the length of the upper portion 106. The first surface 110 may include one or more receiving portions 112-118 for receiving an electrical terminal.

The receiving portions 112-118 may be in the form of apertures and disposed within the first surface 110. The receiving portions 112-118 may be formed into such shapes as a circle, oval, rectangle, triangle, and other such shapes.

In addition, the receiving portions 112-118 may be spaced relatively equidistant from one another. In an alternative arrangement, the receiving portions 112-118 may be spaced in a non-equidistant manner, such that the distances between the receiving portions 112-118 vary.

An electrical terminal, such as electrical terminals 120-126, may be inserted into the receiving portions 112-118. When inserted, an electrical terminal may extend substantially perpendicular from the first surface 110. In one example, the electrical terminal may be a ¼-20 bolt. However, other sizes and types of electrical terminals may also be used, such as a ¼-28 bolt, a 1-8 bolt, ¼-20 threaded stud, or other such electrical terminal. An electrical terminal may also include any type of fastener, such as a stud, bolt, nail, screw, or other such fastener. One or more electrical cables (not shown) may be affixed to the first bus bar extension piece via the electrical terminals 120-126. The electrical terminals 120-126 may also be connected with other electrical conductors, such as another bus bar.

A second surface 128 may offset the upper portion 106 of the primary block 104 from the lower portion 108 of the primary block 104. As discussed below with regard to FIG. 3, the upper portion 106 may be offset from the lower portion 108 to allow access to the electrical terminals 120-126 when the first bus bar extension piece 102 is adjacent to a second extension piece.

The lower portion 108 may include a third surface 130 offset from a fourth surface 132. The third surface 130 and the fourth surface 132 may be relatively parallel to one another. However, the third surface 130 and the fourth surface 132 may be relatively orthogonal to the first surface 110. The fourth surface 132 may be lower than the third surface 130, and the third surface 130 may be lower than the second surface 128. As mentioned previously, the third surface 130 and/or the fourth surface 132 may not be painted to facilitate electrical conductivity.

The third surface 130 may include one or more receiving portions 134-136. The receiving portions 134-136 may be in the form of apertures and disposed within the third surface 130. In addition, the receiving portions 134-136 may be circular, but other shapes (e.g., rectangular, square, oval, etc.) are also contemplated. The receiving portions 134-136 may be arranged so as to receive a securing mechanism that secures the lower portion 108 to a bus bar. The securing mechanism may be a fastener, such as a screw, bolt, nail, and so forth. The securing mechanism may also include a cable tie, an anchor, an adhesive, or any other type of securing mechanism.

The fourth surface 132 may also include at least one receiving portion 138. The receiving portion 138 may be in the form of a circular aperture, but other shapes (e.g., rectangular, square, oval, etc.) are also contemplated. The receiving portion 138 may be arranged so as to receive a securing mechanism that further secures the lower portion 108 to the bus bar. The securing mechanism inserted into the receiving portion 138 may be the same, or different from, the securing mechanism inserted into the one or more receiving portions 134-136. The receiving portion 138 may provide further stability to the first bus bar extension piece 102 when the first bus bar extension piece 102 is connected to the bus bar.

In addition to securing the first bus bar extension piece 102 to the bus bar, the receiving portions 134-136 and receiving portion 138 may further facilitate the transfer of electricity from the bus bar to the first bus bar extension piece 102. For example, the receiving portions 134-136 and the receiving portion 138 may receive a fastener that has passed through, or extends from, a conductive portion of the bus bar. When the fastener from the bus bar then contacts the receiving portions 134-136 and/or the receiving portion 138, the receiving portions 134-136 and/or the receiving portion 138 may then provide a stable and secure electrical connection between the first bus bar extension piece 102 and the bus bar.

Figure 2:
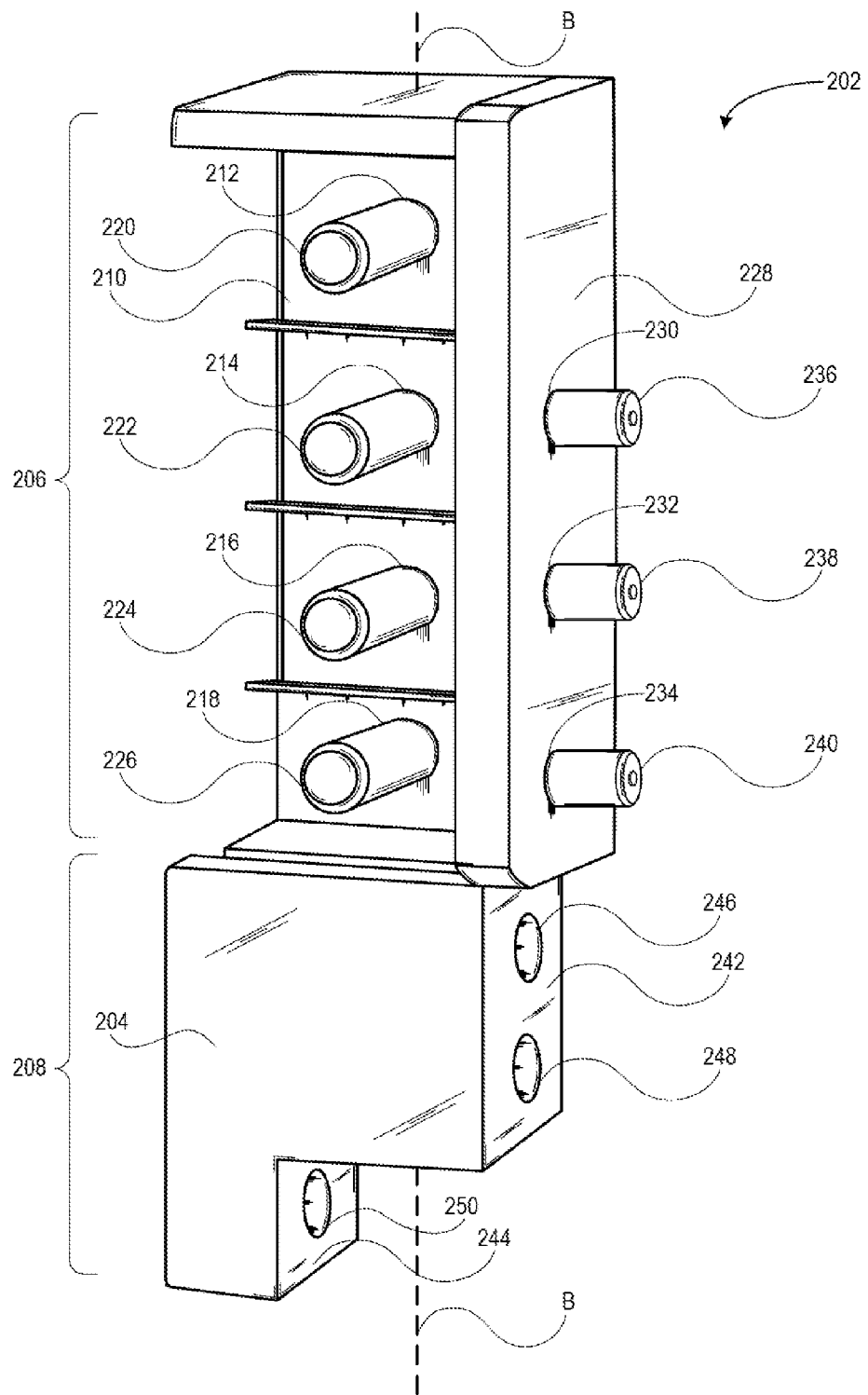
FIG. 2 illustrates an example of a second extension piece for a bus bar extender according to aspects of the disclosure.

FIG. 2 illustrates an example of a second bus bar extension piece 202. The second bus bar extension piece 202 may include a primary block 204. The primary block 204 may be constructed as a unitary structure, and formed from a conductive metal, such as copper or the like. The primary block 204 may be painted with a dielectric powder coat and color coded, using a red color, a black color, or the like, to assist in the assembly of the bus bar extender. A vertically-oriented main axis B may extend lengthwise through the primary block 204.

The primary block 204 may include an upper portion 206 and a lower portion 208. The upper portion 206 may include a first surface 210 that extends substantially along the length of the upper portion 206. In one implementation, the first surface 210 may not be painted so as to facilitate electrical conductivity.

The first surface 210 may include one or more receiving portions 212-218 for receiving an electrical terminal. The receiving portions 212-218 may be disposed within the first surface 210 and may be circular. In addition, the receiving portions 212-218 may be spaced relatively equidistant from one another. Furthermore, the first surface 210 may be divided into sections that visually separate the receiving portions 212-218.

An electrical terminal, such as electrical terminals 220-226, may be inserted into the receiving portions 212-218. When inserted, an electrical terminal may extend substantially perpendicular from the first surface 210. In one example, the electrical terminal may be a ¼-20 bolt. However, other sizes and types of electrical terminals may also be used, such as a ¼-28 bolt, a 1-8 bolt, ¼-20 threaded stud, or other such electrical terminal. An electrical terminal may also include any type of fastener, such as a stud, bolt, nail, screw, or other such fastener. One or more electrical cables (not shown) may be affixed to the second bus bar extension piece 202 via the electrical terminals 220-226. The electrical terminals 220-226 may also be connected with other electrical conductors, such as another bus bar.

The second bus bar extension piece 202 may include a second surface 228 that includes one or more receiving portions 230-234. The receiving portions 230-234 may be in the form of apertures and disposed within the second surface 228. In addition, the receiving portions 230-234 may be circular, but other shapes (e.g., rectangular, square, oval, etc.) are also contemplated.

The receiving portions 230-234 may receive a securing mechanism, such as fasteners 236-240, for securing the second bus bar extension piece 202 to a support for a bus bar. That is, the fasteners 230-234 may or may not be conductive in that the fasteners 230-234 provide further stability to the second bus bar extension piece 202. The fasteners 230-234 may be a bolt, stud, nail, and the like. In one example, the fasteners 230-234 may be ¼-20 size studs that protrude substantially perpendicular from the second surface 228. When secured to a bus bar support, the second surface 228 may lie relatively flush with the surface of the bus bar support. In addition, the attachment of the securing mechanisms 236-240 to the bus bar support may provide a measure of grounding for the assembled bus bar extender (e.g., the assembly of the first bus bar extension piece 102 and the second bus bar extension piece 202).

The lower portion 208 may include a third surface 242 offset from a fourth surface 244. The third surface 242 and the fourth surface 242 may be relatively parallel to one another. However, the third surface 242 and the fourth surface 244 may be relatively orthogonal to the first surface 210. The fourth surface 244 may be lower than the third surface 242, and the third surface 242 may be lower than the second surface 228. In one implementation, the third surface 242 and/or the fourth surface 244 may not be painted so as to facilitate electrical conductivity.

The third surface 242 may include one or more receiving portions 246-248. The receiving portions 246-248 may be disposed within the third surface 242. In addition, the receiving portions 246-248 may be in the form of circular, apertures, but other shapes (e.g., rectangular, square, oval, etc.) are also contemplated. The receiving portions 246-248 may be arranged so as to receive a securing mechanism that secures the lower portion 208 to the bus bar. The securing mechanism may be a fastener, such as a screw, bolt, nail, and so forth. The securing mechanism may also include a cable tie, an anchor, an adhesive, or any other type of securing mechanism.

The fourth surface 244 may also include at least one receiving portion 250. The receiving portion 250 may be in the form of a circular aperture, but other shapes (e.g., rectangular, square, oval, etc.) are also contemplated. The receiving portion 250 may be arranged so as to receive a securing mechanism that further secures the lower portion 208 to the bus bar. The securing mechanism inserted into the receiving portion 250 may be the same, or different from, the securing mechanism inserted into the one or more receiving portions 246-248. The receiving portion 250 may provide further stability to the second bus bar extension piece 202 when the second bus bar extension piece 202 is connected to the bus bar.

In addition to securing the second bus bar extension piece 202 to the bus bar, the receiving portions 246-248 and receiving portion 250 may further facilitate the transfer of electricity from the bus bar to the second bus bar extension piece 202. For example, the receiving portions 246-248 and the receiving portion 250 may receive a fastener that has passed through, or extends from, a conductive portion of the bus bar. When the fastener from the bus bar then contacts the receiving portions 246-248 and/or the receiving portion 250, the receiving portions 246-248 and/or the receiving portion 250 may then provide a stable and secure electrical connection between the second bus bar extension piece 202 and the bus bar.

Figure 3:
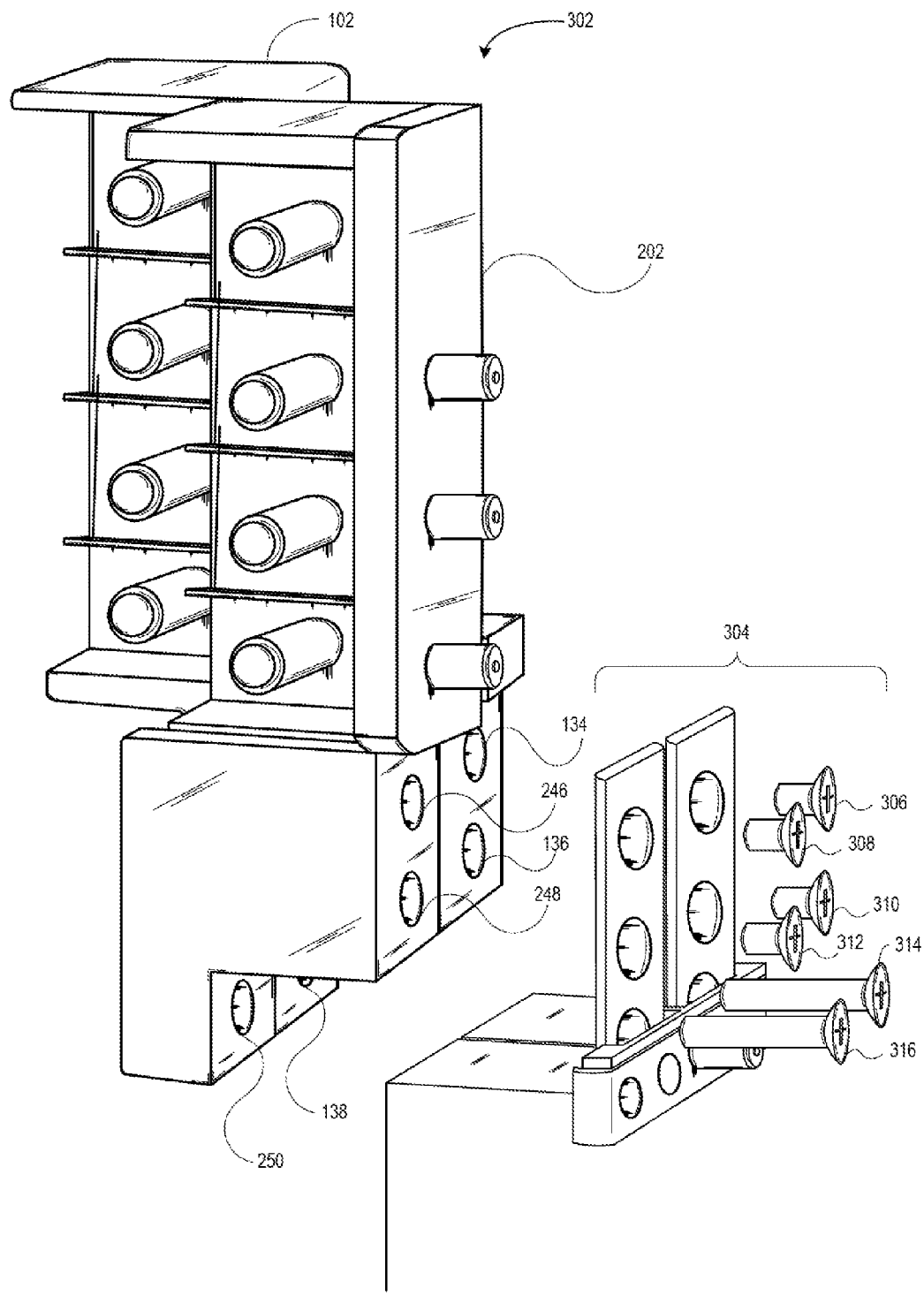
FIG. 3 illustrates an example of securing the disclosed bus bar extender to a bus bar assembly using one or more fasteners according to aspects of the disclosure.

FIG. 3 illustrates an example of the assembled bus bar extender 302 being secured to a top portion of the bus bar assembly 304. The top portion of the bus bar assembly 304 is illustrated in FIG. 3 to aid in the reader in understanding how the lower portions 108,208 of the bus bar extension pieces 102,202 are secured to the bus bar assembly 304. In one implementation, the bus bar assembly 304 may include one or more rails to which the extension pieces 102,202 are secured.

One or more fasteners 306-316 may be used to secure each of the bus bar extension pieces 102,202 to the bus bar assembly 304. Not shown is a bus bar support that supports the bus bar assembly 304, to which one or more of the securing mechanisms 236-240 may be secured. As discussed previously, the securing mechanisms 236-240 may also form an electrical connection with the bus bar support.

To secure the bus bar assembly 304 to the bus bar extension pieces, each of the fasteners 306-316 may pass through the bus bar assembly 304 and be received in a corresponding receiving portion of the lower portion of the first bus bar extension piece 102 or the second bus bar extension piece 202. For example, a first set of fasteners 306-308 may be received by the receiving portion 134 of the first bus bar assembly piece 102 and by the receiving portion 246 of the second bus bar assembly piece 202. Similarly, a second set of fasteners 310-312 may be received by the receiving portion 136 of the first bus bar assembly piece 102 and by the receiving portion 248 of the second bus bar extension piece 202. Finally, a third set of fasteners 314-316 may be received by the receiving portion 138 of the first bus bar assembly piece 102 and by the receiving portion 250 of the second bus bar assembly piece 202. Although shown removed from the bus bar assembly 304, it should be understood that the fasteners 306-316 may be received by the receiving portions prior to the placement of supporting structures that would impede access to the receiving portions of the first bus bar assembly piece 102 or the second bus bar assembly piece 202.

Figure 4:
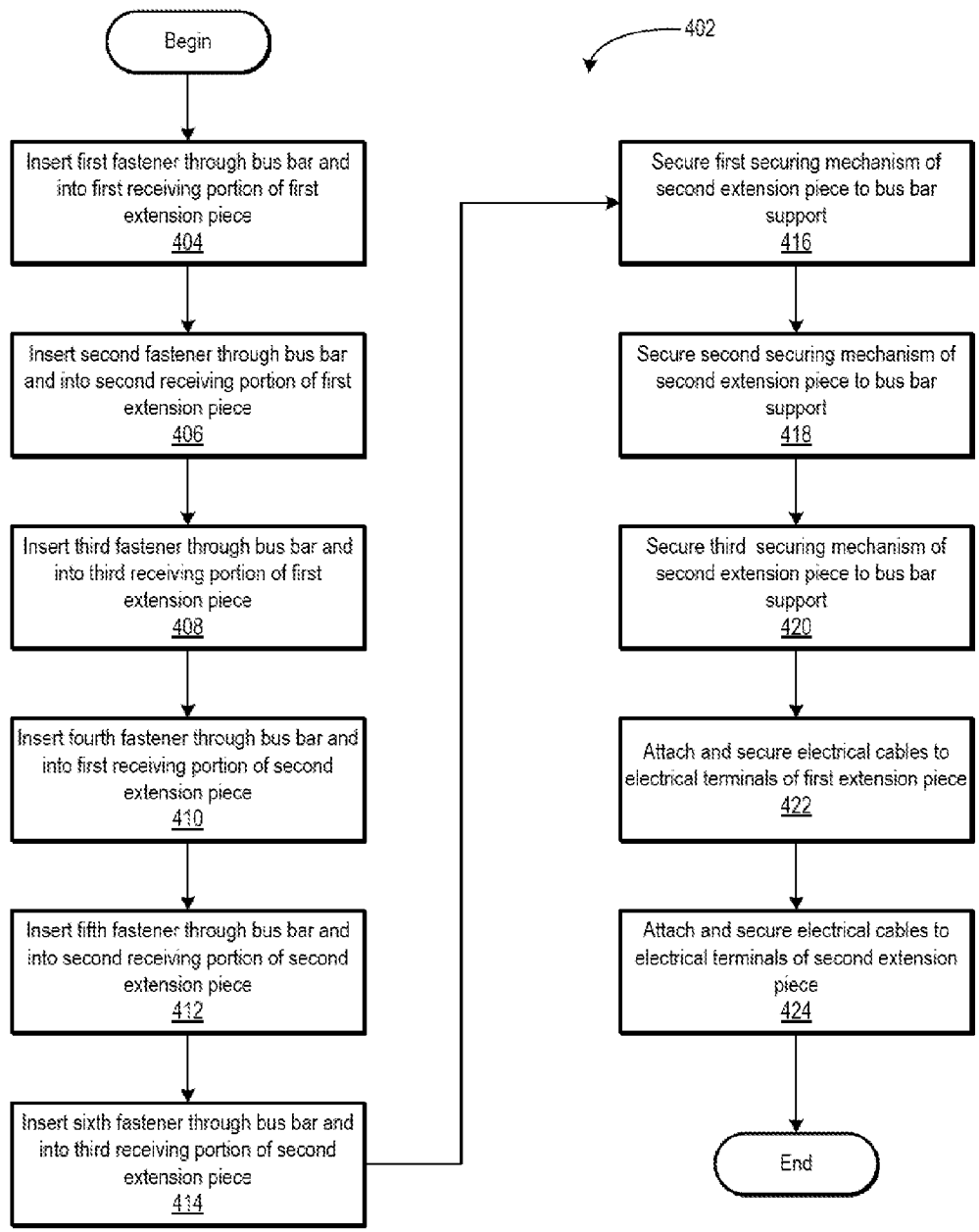
FIG. 4 illustrates an example of logic flow for securing the bus bar extender according to aspects of the disclosure.

FIG. 4 illustrates an example of logic flow 402 for securing the bus bar extender 302 to the bus bar assembly 304. It should be understood that the operations depicted and described with regard to FIG. 4 do not have to be performed in the precise order described below. Rather, various steps and/or operations can be handled in a different order or simultaneously, and steps and/or operations may also be added or omitted.

To secure the first extension piece 102 to the bus bar assembly 304, one may first insert one or more fasteners through one or more receiving portions of the first bus bar extension piece. Accordingly, and with reference to FIGS. 1 and 3, a first fastener 306 may be inserted into a bus bar assembly 304, and into a first receiving portion 134 of the first bus bar extension piece 102 (Block 404). A second fastener 310 may then be inserted into the bus bar assembly 304 and into a second receiving portion 136 of the first bus bar extension piece 102 (Block 406). Finally, a third fastener 314 may then be inserted into the bus bar assembly 304 and into a third receiving portion 138 of the first bus bar extension piece 102 (Block 408). In this manner, a secure electrical connection may be established between the first bus bar extension piece 102 and the bus bar assembly 304.

Similar acts may be performed to secure the second bus bar extension piece 202 to the bus bar assembly 304. With reference to FIGS. 2 and 3, a fourth fastener 308 may be inserted through the bus bar assembly 304 and into a first receiving portion 246 of the second bus bar extension piece 202 (Block 410). A fifth fastener 312 may then be inserted through the bus bar assembly 304 and into a second receiving portion of the second bus bar extension piece 202 (Block 412). Finally, a sixth fastener 316 may be inserted through the bus bar assembly 304 and into the third receiving portion 250 of the second extension piece 202 (Block 414). Thusly, a secure electrical connection may be established between the second bus bar extension piece 202 and the bus bar assembly 304.

In addition to securing the second extension piece 202 to a bus bar assembly 304, the second extension piece 202 may be secured to a bus bar support structure (not shown) of the bus bar assembly. Accordingly, a first securing mechanism 236 of the second extension piece 202 may be secured to the bus bar support (Block 416). A second securing mechanism 238 may then be secured to the bus bar support (Block 418). Finally, a third securing mechanism 240 may then be secured to the bus bar support (Block 420).

Once secured to the bus bar assembly 304, one or more cables may then be attached to the bus bar extender 302. Accordingly, the logic flow 402 illustrates attaching and securing one or more cables to the electrical terminals 120-126 of the first bus bar extension piece 102 (Block 422), and attaching and securing one or more cables to the electrical terminals 220-226 to the second bus bar extension piece 202 (Block 424). The cables may be attached and secured to the electrical terminals using a connector, such as a barrel copper lug or the like, and secured to the electrical terminals using a fastener, such as a washer, nut, and the like. The order in which the cables are attached to the bus bar extender 302 may be dependent on which bus bar extension piece is considered electrically "positive" and which bus bar extension piece is considered electrically "negative."

Thusly, the second bus bar extension piece 202 may be further secured to a bus bar support structure. In addition, the attachment of the securing mechanisms to the bus bar support structure may provide grounding for the bus bar extender 302.

In this manner, the bus bar extender 302 physically extends the length of a bus bar assembly 304 and provides additional electrical connections for connecting devices to the bus bar. As the bus bar extender 302 includes two assembly pieces (i.e., the first bus bar assembly piece 102 and the second bus bar assembly piece 202), construction and deconstruction of the bus bar extender 302 is easy and reduces the amount of time one would ordinarily spend in constructing a bus bar assembly replacement. In addition, the disclosed bus bar extender 302 introduces costs savings to a bus bar assembly 304 user, because the bus bar extender 302 may be used in place of constructing a new bus bar assembly to replace the prior bus bar assembly. Moreover, the disclosed bus bar extender 302 provides for electrical connections under space-limited conditions. Thus, there are significant monetary, time, and space savings in leveraging the capabilities of the disclosed bus bar extender 302.

As these and other variations and combinations of the features discussed above can be utilized without departing from the subject matter as defined by the claims, the foregoing description should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. An apparatus for extending a bus bar, the apparatus comprising:
   a first extension piece, the first extension piece comprising:
      a first vertically-oriented main axis;
      a first surface offset and parallel to the first vertically-oriented main axis, the first surface comprising a first plurality of receiving portions;
      a second surface, the second surface offset and parallel to the first-vertically oriented main axis, the second surface comprising a second plurality of receiving portions, wherein the second plurality of receiving portions are configured to establish an electrical connection between the first extension piece and a bus bar and wherein a projection of the first surface onto the first vertically-oriented main axis has a first length and a projection of the second surface onto the first vertically-oriented main axis has a second length, and wherein the second length is at least partially offset from the first length with respect to the projections onto the first vertically-oriented main axis; and
      a third surface offset and parallel to the first-vertically oriented main axis, the third surface comprising a curved portion; and
   a second extension piece, the second extension piece comprising:
      a second vertically-oriented main axis;
      a fourth surface offset and parallel to the second vertically-oriented main axis, the fourth surface comprising a third plurality of receiving portions;
      a fifth surface offset and parallel to the second vertically-oriented main axis, the fifth surface comprising a fourth plurality of receiving portions; and
      a sixth surface offset and parallel to the second vertically-oriented main axis, the sixth surface comprising a fifth plurality of receiving portions configured to establish an electrical connection between the second extension piece and the bus bar; and
   wherein the first extension piece is connectable to the bus bar via the second plurality of receiving portions and the second extension piece is connectable to the bus bar via the fifth plurality of receiving portions.

2. The apparatus of claim 1, wherein a receiving portion of the first plurality of receiving portions is defined by an aperture disposed within the first surface.

3. The apparatus of claim 1, wherein a receiving portion of the first plurality of receiving portions receives a terminal for electrically connecting an electronic device to the bus bar.

4. The apparatus of claim 1, wherein the first plurality of receiving portions are formed in a first plane, the second plurality of receiving portions are formed in a second plane, and the first plane is substantially perpendicular to the second plane.

5. The apparatus of claim 1, wherein:
   a receiving portion of the second plurality of receiving portions is defined by an aperture disposed within the second surface; and
   the first extension piece is connectable to the bus bar via a securing mechanism that enters into the aperture.

6. The apparatus of claim 1, wherein a receiving portion of the third plurality of receiving portions is defined by an aperture disposed within the fourth surface.

7. The apparatus of claim 1, wherein a receiving portion of the third plurality of receiving portions receives a terminal for electrically connecting an electronic device to the bus bar.

8. The apparatus of claim 1, wherein the third plurality of receiving portions are formed within a first plane, the fourth plurality of receiving portions are formed within a second plane, and the first plane is substantially perpendicular to the second plane.

9. The apparatus of claim 1, wherein:
   a receiving portion of the fifth plurality of receiving portions is defined by an aperture disposed within the sixth surface; and
   the second extension piece is connectable to the bus bar via a securing mechanism that enters into the aperture.

10. The apparatus of claim 1, wherein:
    the first surface defines a first plane;
    the second surface defines a second plane;
    the fourth surface defines a third plane;
    the fifth surface defines a fourth plane;

the first plane is offset in a first direction substantially perpendicular to the second plane; and the third plane is offset in a second direction substantially perpendicular to the fourth plane.

11. The apparatus of claim 1, wherein the first extension piece comprises a first unitary structure, the second extension piece comprises a second unitary structure, and the first unitary structure is physically separate from the second unitary structure.

12. An apparatus for extending a bus bar, the apparatus comprising:

a vertically-oriented main axis;

a first surface offset and parallel to the vertically-oriented main axis, the first surface having a first plurality of receiving portions, and each receiving portion is spaced apart along the first surface a second surface offset and parallel to the vertically-oriented main axis, the second surface being substantially perpendicular to the first surface and comprising a second plurality of receiving portions, wherein each receiving portion is spaced apart along the second surface and configured to establish an electrical connection between a bus bar and a corresponding receiving portion of the first plurality of receiving portions, wherein a projection of the first surface onto the first vertically-oriented main axis has a first length and a projection of the second surface onto the first vertically-oriented main axis has a second length, and wherein the second length is at least partially offset from the first length with respect to the projections onto the first vertically-oriented main axis; and a third surface offset and parallel to the vertically-oriented main axis, substantially parallel to the second surface and substantially perpendicular to the first surface, and wherein the third surface is disposed between the first surface and the second surface.

13. The apparatus of claim 12, wherein a receiving portion of the first plurality of receiving portions is defined by an aperture disposed within the first surface.

14. The apparatus of claim 12, wherein a receiving portion of the first plurality of receiving portions receives a terminal for electrically coupling an electronic device to a bus bar.

15. The apparatus of claim 12, wherein:

a receiving portion of the second plurality of receiving portions is defined by an aperture disposed within the second surface; and the second surface is connectable to a bus bar via a securing mechanism that enters into the aperture.

16. The apparatus of claim 12, wherein the third surface comprises a curvature that laterally offsets the third surface from the second surface.

17. An apparatus for extending a bus bar, the apparatus comprising:

a vertically-oriented main axis;

a first surface offset and parallel to the vertically-oriented main axis, the first surface having a first plurality of receiving portions, wherein each receiving portion is spaced apart along the first surface;

a second surface offset and parallel to the vertically-oriented main axis, the second surface being substantially perpendicular to the first surface and comprising a second plurality of receiving portions, wherein each receiving portion is spaced apart along the second surface, wherein a projection of the first surface onto the first vertically-oriented main axis has a first length and a projection of the second surface onto the first vertically-oriented main axis has a second length, and wherein the second length is at least partially offset from the first length with respect to the projections onto the first vertically-oriented main axis; and a third surface offset and parallel to the vertically-oriented main axis, the third surface being substantially parallel to the second surface and substantially perpendicular to the first surface, wherein the third surface comprises a third plurality of receiving portions, each receiving portion being spaced apart along the third surface and configured to establish an electrical connection between a bus bar and a corresponding receiving portion of the first plurality of receiving portions.

18. The apparatus of claim 17, wherein a receiving portion of the first plurality of receiving portions is defined by an aperture disposed within the first surface.

19. The apparatus of claim 17, wherein a receiving portion of the first plurality of receiving portions receives a terminal for electrically coupling an electronic device to a bus bar.

20. The apparatus of claim 17, wherein:

a receiving portion of the third plurality of receiving portions is defined by an aperture disposed within the second surface; and the third surface is connectable to a bus bar via a securing mechanism that enters into the aperture.

21. The apparatus of claim 17, wherein:

a receiving portion of the second plurality of receiving portions is defined by an aperture disposed within the second surface; and the second surface is connectable to a support structure that supports a bus bar via a securing mechanism that enters into the aperture.

\* \* \* \* \*